(12) United States Patent
Gehring et al.

(10) Patent No.: US 7,660,567 B1
(45) Date of Patent: Feb. 9, 2010

(54) DIGITAL RECEIVED SIGNAL STRENGTH INDICATOR (RSSI) CIRCUIT AND METHOD FOR DETECTING THE STRENGTH OF A RECEIVED SIGNAL

(75) Inventors: Mark R. Gehring, Portland, OR (US); Joseph D. Stenger, North Plains, OR (US)

(73) Assignee: Cypress Semiconductor Corporation, San Jose, CA (US)

( * ) Notice: Subject to any disclaimer, the term of this patent is extended or adjusted under 35 U.S.C. 154(b) by 530 days.

(21) Appl. No.: 11/531,886

(22) Filed: Sep. 14, 2006

Related U.S. Application Data (60) Provisional application No. 60/719,008, filed on Sep. 21, 2005.

(51) Int. Cl.
*H04B 17/00* (2006.01)

(52) U.S. Cl. .................................. 455/226.2
(58) Field of Classification Search ............. 455/226.1, 455/226.2, 226.4
See application file for complete search history.

(56) References Cited

U.S. PATENT DOCUMENTS

| | | | |
|---|---|---|---|
| 5,875,390 A * | 2/1999 | Brehmer et al. ........... | 455/226.2 |
| 6,311,049 B1 * | 10/2001 | Yoshizawa ............... | 455/250.1 |
| 2004/0038657 A1 | 2/2004 | Bae | |
| 2004/0161026 A1 | 8/2004 | Jensen et al. | |

* cited by examiner

*Primary Examiner*—Nguyen Vo (57) ABSTRACT

An improved Received Signal Strength Indicator (RSSI) circuit and method is provided herein for quickly and accurately detecting the strength of a received signal. The circuit described herein provides a more accurate RSSI signal, while consuming less power and die area, by utilizing digital rather than analog summing.

20 Claims, 6 Drawing Sheets

DIGITAL RECEIVED SIGNAL STRENGTH INDICATOR (RSSI) CIRCUIT AND METHOD FOR DETECTING THE STRENGTH OF A RECEIVED SIGNAL

PRIORITY CLAIM

The captioned application claims priority to U.S. Provisional Application No. 60/719,008 entitled "Digital Received Signal Strength Indicator (RSSI) Circuit and Method for Detecting the Strength of a Received Signal," filed Sep. 21, 2005.

BACKGROUND OF THE INVENTION

1. Field of the Invention

This invention relates to wireless communication devices and, more particularly, to a digital Received Signal Strength Indicator (RSSI) circuit used within a wireless receiver.

2. Description of the Related Art

The following descriptions and examples are given as background only.

Communications systems are known to support both wired and wireless communication devices. Such communication systems range from national to international cellular telephone systems, to the Internet, to point-to-point wireless networks. Each type of communication system is constructed, and hence operates, in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-port distribution systems (MMDS), and/or variations thereof.

Each wireless device to participate in wireless communications may include a built-in radio transceiver (i.e., a receiver and transmitter), or may be coupled to an associated radio transceiver (e.g., a station for in-home and/or in-building wireless communications networks, an RF modem, etc.). As is known, the transmitter may generally include a data modulation stage, one or more intermediate frequency stages and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

Figure 1:
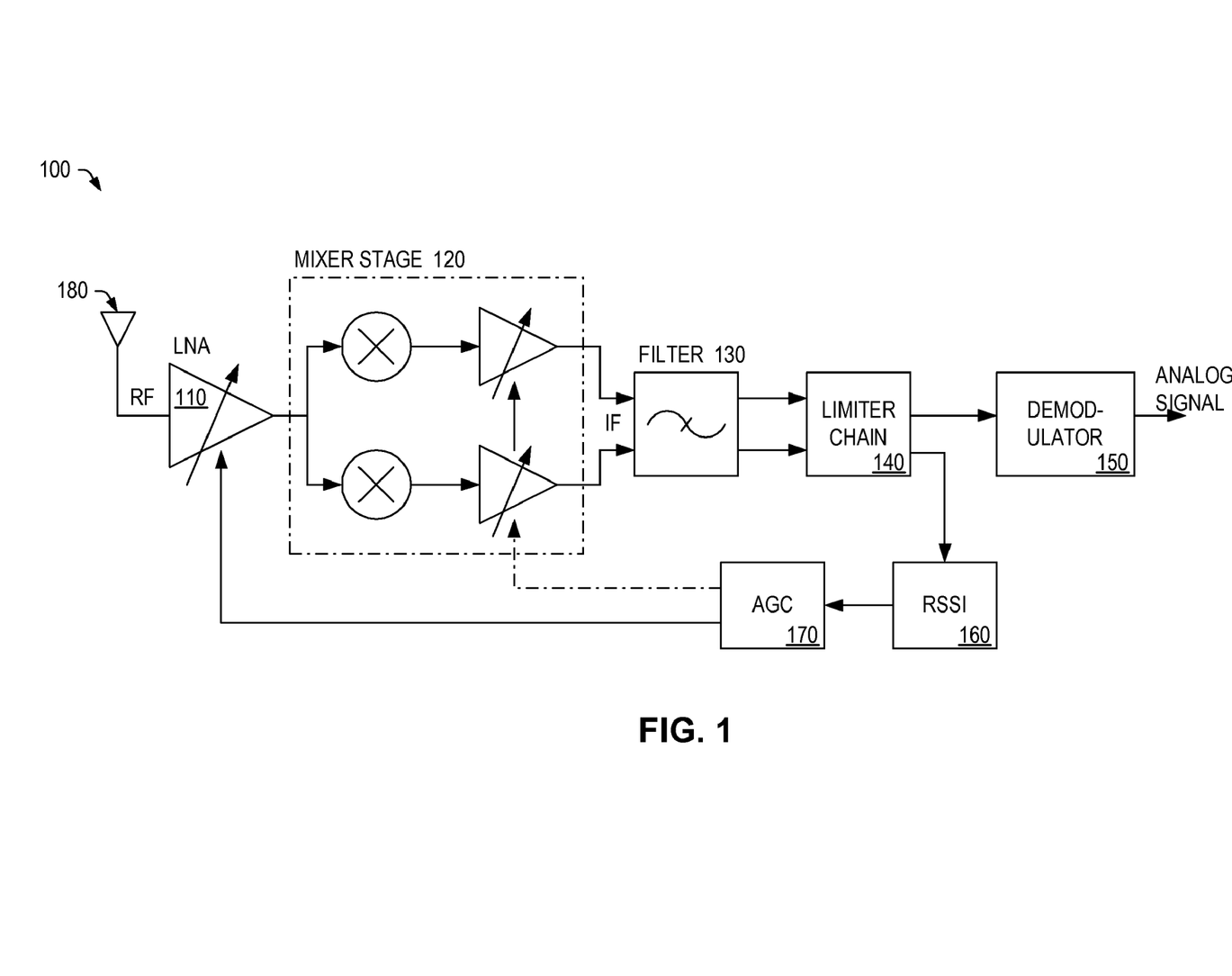
FIG. 1 is a block diagram of an exemplary receiver design that may be used within a wireless communication device.

FIG. 1 is a block diagram of an analog receiver of a built-in radio transceiver. As shown in FIG. 1, the receiver portion 100 may include a low noise amplifier (LNA) 110, a mixer stage 120, a bandpass filter 130, a chain of limiting gain amplifiers (i.e., limiters) 140, a demodulator 150, a received signal strength indicator (RSSI) circuit 160 and an automatic gain control (AGC) module 170. Once a radio frequency (RF) signal is detected by antenna 180, the LNA amplifies the RF signal to a level, which is acceptable for processing in subsequent stages of the receiver. The mixer stage, which may include mixers and variable gain blocks, translates the RF signal into a low or zero intermediate frequency (IF) signal. The IF signal is filtered by the bandpass filter. An analog circuit demodulates the filtered signal to recapture the raw data contained in the received RF signal. In a digital receiver design, an analog to digital converter (ADC) and digital channel filter may be inserted between the limiters 140 and demodulator 150. In this case, a digital processor may be used to demodulate the filtered signal.

Vital to the operation of the receiver is the accurate and timely setting of the controls of the variable gain blocks and/or the LNA (and possibly the ADC, in a digital receiver design), based on the strength of the received signal. If the gain controls are set inappropriately, the receiver may suffer from reduced sensitivity or may malfunction due to node saturation.

The automatic gain control (AGC) module drives the controls of the variable gain blocks (and/or the LNA) to the desired settings, which allow the receiver to operate optimally. The AGC employs a feedback mechanism to ensure that the setting of the gain controls occurs in a timely manner. However, proper operation of the AGC depends on the availability of an accurate and nearly-instantaneous indication of the strength of the received signal. Such indication, referred to as a received signal strength indication (RSSI) value, is provided by the RSSI circuit.

Many RSSI circuits include an analog summing amplifier followed by an analog to digital converter. The analog voltages generated by each of the limiters 140 are added together by the analog summing amplifier. The sum of the analog voltages is then converted into a digital signal by the analog to digital converter. Since most of the signal processing within the RSSI circuit is analog, conventional designs suffer from relatively high die area requirement, relatively high power consumption, and imprecision due to process variations, temperature variations and random circuit component mismatch.

Therefore, a need exists for an improved RSSI circuit and method for detecting the signal strength of a received signal. Such a circuit and method would preferably reduce die area and power consumption of the circuit, while increasing the accuracy and speed with which the RSSI signal is generated.

SUMMARY OF THE INVENTION

The following description of various embodiments of receivers, received signal strength indicator (RSSI) circuits and methods is not to be construed in any way as limiting the subject matter of the appended claims.

According to one embodiment, an improved method is provided herein for detecting the strength of a received signal. In general, the method may include receiving an analog input signal and detecting the strength of the analog input signal by: (i) converting the analog input signal into a plurality of DC voltages, where each successive DC voltage is progressively larger than a previous DC voltage, and (ii) converting the plurality of progressively larger DC voltages into a plurality of digital values before the digital values are combined to produce a digital received signal strength indication (RSSI) value. In general, the plurality of digital values may be produced by comparing each of the plurality of progressively larger DC voltages to an internally generated reference voltage. If each of the digital values comprises only one bit, the digital RSSI value may be produced by outputting each of the plurality of digital values one at a time. However, if each of the digital values comprises more than one bit, the digital RSSI value may be produced by adding the plurality of digital values together and outputting the sum.

According to another embodiment, an improved Received Signal Strength Indicator (RSSI) circuit is provided herein for detecting the strength of a received signal. In general, the RSSI circuit improves upon previous circuit designs by providing digital, rather than analog summing of the limiter chain voltages. For example, the RSSI circuit may be coupled to a chain of limiting gain amplifiers (or "limiters"). In most cases, the chain of limiters may be coupled in series, with a first limiter configured for receiving an analog input signal and with each successive limiter configured for generating a progressively larger DC voltage based on the signal strength of the analog input signal. An additional (i.e., dummy) limiter may be coupled to the chain of limiters for generating a reference voltage, which tracks process and temperature variations within the circuit.

In one embodiment, each limiter may include a pair of bipolar transistors. In order to generate the progressively larger DC voltages, the base terminals of each successive limiter (after the first limiter) may be coupled to the collector terminals of a preceding limiter. This enables a progressively larger DC voltage to be generated at the common emitter terminals of the bipolar transistors within each successive limiter. In other words, each of the limiters is configured for imparting gain to the analog input signal. By coupling the base and collector terminals as described above, each successive limiter may be configured for generating a progressively larger DC voltage at its common emitter terminal due to the gain imparted by the previous limiter(s). The common emitter voltages (i.e., the progressively larger DC voltages) may then be supplied, along with the reference voltage, to the RSSI circuit.

In a general embodiment, the RSSI circuit may include a plurality of analog to digital converters (ADCs), each coupled to the additional limiter and a different one of the successive limiters for converting the progressively larger DC voltages into distinct digital values by comparing each of the DC voltages to the reference voltage. The digital values may then be combined to form a digital RSSI value. For example, if single-bit ADCs are used, the digital value from each ADC may be output one at a time to form the digital RSSI word. If multi-bit ADCs are used, digital summing logic may be included within the RSSI circuit for generating the digital RSSI word by adding together the multi-bit digital values.

According to another embodiment, a wireless receiver circuit is provided herein. In general, the receiver circuit may include an antenna for receiving an analog input signal and a received signal strength indicator (RSSI) circuit for detecting the strength of the analog input signal. As noted above, the RSSI circuit may produce a digital RSSI value by converting a plurality of progressively larger DC voltages associated with the analog input signal into a plurality of digital values before the digital values are combined to form a digital RSSI value.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

In general, a received signal strength indicator (RSSI) circuit may be used within an analog or digital receiver for generating a digital RSSI value, which is proportional to the strength of a received signal by a radio. In other words, the RSSI circuit may be used to determine the relative signal strength at the input to the receiver. The RSSI value may be supplied to various system components, including but not limited to, an Auto Gain Control (AGC) module, a digital baseband, a microprocessor, or any other logical control system capable of reading and using the RSSI information. As such, the RSSI value can be used for multiple functions, such as determining if the AGC module should reduce the gain of the receiver, determining if a channel is occupied by another signal, among others.

Figure 2:
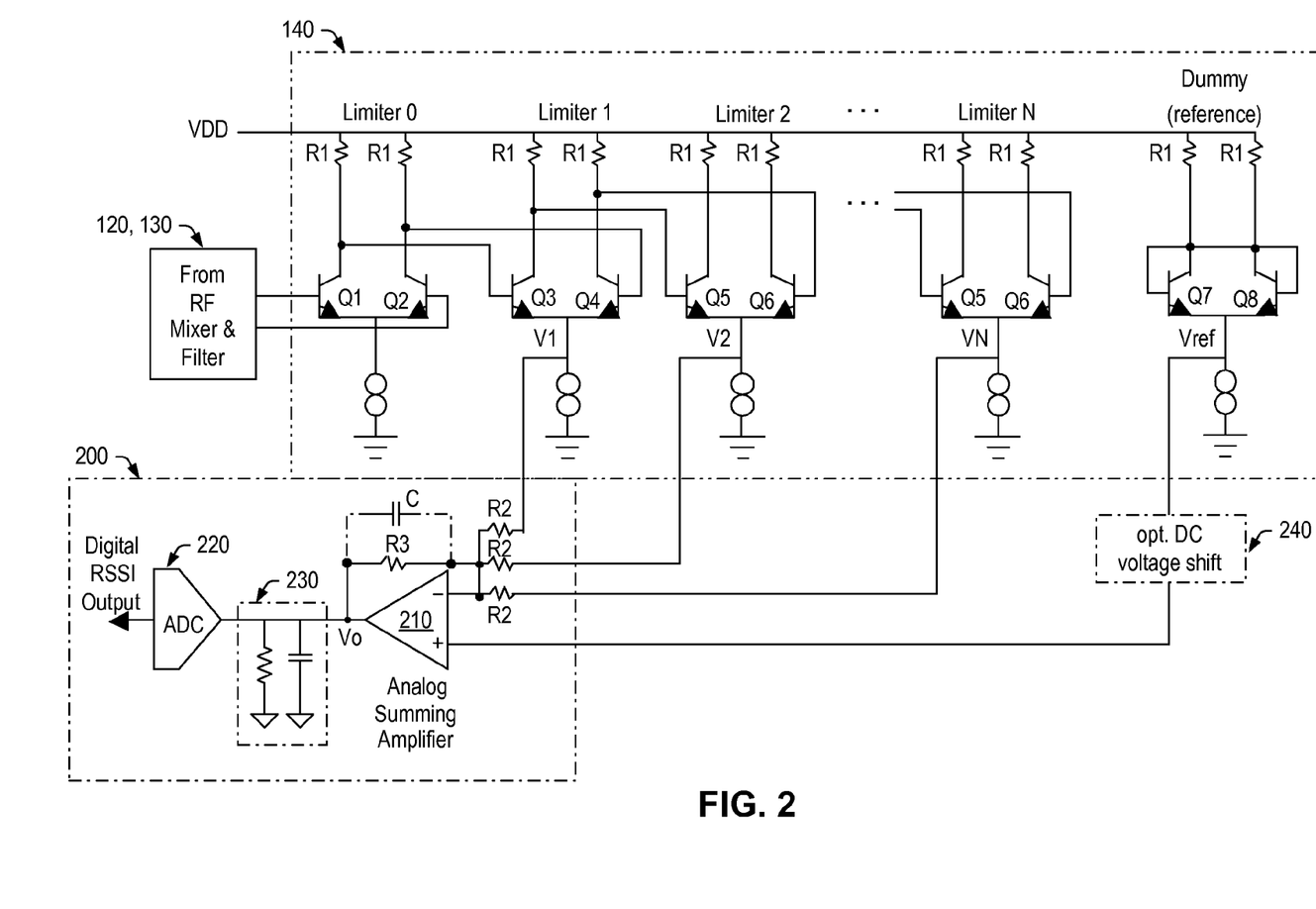
FIG. 2 is a simplified circuit schematic of an exemplary RSSI circuit that may be included within a receiver, such as the receiver design shown in FIG. 1.

In a typical radio integrated circuit, a digital number that represents the RSSI may be generated by summing the analog voltages generated by a chain of limiting gain amplifiers (e.g., 140, as shown in FIG. 1) and then digitizing the sum. As shown in FIG. 2, each limiting gain amplifier (or "limiter") may include a pair of differential bipolar transistors with common emitter terminals. The collector terminals of the bipolar transistors may be coupled to a power supply voltage (VDD) through a resistive load (R1). The base terminals of a first differential pair (limiter 0) are coupled for receiving the intermediate frequency (IF) signal from the mixer and filter stages (120, 130) of the receiver, while the base terminals of all remaining limiters (e.g., limiters 1, 2 . . . N) are coupled to the collector terminals of a preceding differential pair.

In most cases, each limiter in the chain will be substantially identical (i.e., formed with substantially identical transistors and resistors), so that the limiters may closely track each other over process and temperature variations. In some cases, the limiters may be implemented with MOS transistors, instead of the bipolar transistors shown in FIG. 2. For example, MOS transistors may be used in embodiments which prefer to reduce cost over offsets. The selection of process technology is, therefore, application specific and may vary according to the needs of a particular receiver design. In addition, one skilled in the art will recognize that substantially any resistor value (R1) may be used in conjunction with any current value to achieve a desired gain factor and signal limit value along the limiter chain (as described in more detail below).

When the IF signal from the mixer and filter stages (120, 130) is supplied to the chain of limiting gain amplifiers (140), it is level shifted by the first limiter (limiter 0) to ensure that the same base voltage is supplied to each and every limiter. The signal input to each limiter is rectified at the common emitters to convert the AC input signal into a DC voltage. Since the base terminals of subsequent limiters are coupled to the collector terminals of preceding limiters, a progressively larger DC voltage is generated at the emitter terminal of each successive limiter. This enables a small AC signal to be amplified into a progressively larger transient signal as it travels down the limiter chain.

The DC voltages (e.g., V1, V2 . . . VN) generated at each emitter node are then compared to a reference voltage (Vref)

generated by a dummy limiter that has no signal driving it (i.e., the base and collector terminals of the differential transistors within the dummy limiter are coupled together). In some cases, the comparison of the DC voltages to the reference voltage may be performed by RSSI circuit 200. As shown in FIG. 2, RSSI circuit 200 includes an analog summing amplifier 210 followed by an analog-to-digital converter (ADC) 220. The potential differences between the reference voltage and each of the coupled emitter nodes are added together by operational amplifier (or "op-amp") 210. For example, the summation signal (Vo) generated by op-amp 210 may be substantially equal to:

$$Vo = Vref - \frac{R3}{R2}(V1 + V2 + \ldots + VN). \quad \text{EQ. 1}$$

As shown in EQ. 1, op-amp 210 may provide a gain (e.g., R3/R2 in FIG. 2) for scaling the summation signal before it is converted into a digital value by ADC 220. In most cases, the gain may be set to substantially any value. However, it is generally desired that the values of the R2 resistors be the same, so that each emitter voltage is equally weighted in the summation. In some cases, an optional DC voltage shift (240) could be used to more efficiently utilize the dynamic range of the analog summing amplifier. For example, DC voltage shift 240 could be used to shift the reference voltage, so that it falls within the common mode input range of the analog summing amplifier.

Unfortunately, the RSSI circuit shown in FIG. 2 suffers from many disadvantages. First of all, because analog circuitry (210, R2) is used to add the DC voltages, the RSSI circuit is subject to several errors, including but not limited to, DC offsets in the op-amp and resistor mismatch. Any mismatch between the base voltages of each limiter differential pair will also sum in the op-amp as additional error. Other problems associated with the use of analog summing circuitry may include: (i) the RSSI range can be limited by the analog circuitry dynamic range, unless complex analog circuitry is used; and (ii) an RC filter with a large time constant (e.g., a large capacitor and/or resistor) may be required to filter out ripples in the RSSI signal. Examples of optional RC filter designs are shown in FIG. 2.

In some cases, an RC filter (230) having a relatively large capacitor and resistor may be inserted between the output of op-amp 210 and the input of ADC 220 to filter the RSSI signal. In other cases, a large capacitor (C) may be placed in shunt with a resistor (R3) in the feedback path of the op-amp to provide the necessary filtering characteristics. In the embodiment of FIG. 2, RC filters are placed in both the output and feedback paths of the op-amp to provide a two-pole filter. However, a lesser or greater number of poles may be needed, in other embodiments of RSSI circuit 200, depending on the particular amount of filtering needed. Regardless of the number of poles used, the large resistive and capacitive components used within the RC filter consume additional die area, which is often undesirable. In addition, large RC time constants tend to reduce the speed with which the RSSI signal is generated, which may hinder other system requirements, such as automatic gain control (AGC) threshold detection.

In some cases, the single analog to digital converter (ADC 220) used within RSSI circuit 200 may be quite large and complicated, depending on the required resolution of the RSSI signal. For example, ADC 220 may be implemented as a direct conversion ADC (or "flash ADC"). As such, ADC 220 may include a bank of comparators (e.g., one comparator for each decoded voltage range) and a logic circuit that generates a code for each voltage range. Although direct conversion is relatively fast, it is usually limited to providing 8 bits of resolution (i.e., 256 comparators) or less, due to the large cost and area associated with the comparators. In addition to large die size, direct conversion ADCs are prone to high input capacitance and often produce glitches on the output (by outputting an out-of-sequence code).

Figure 3:
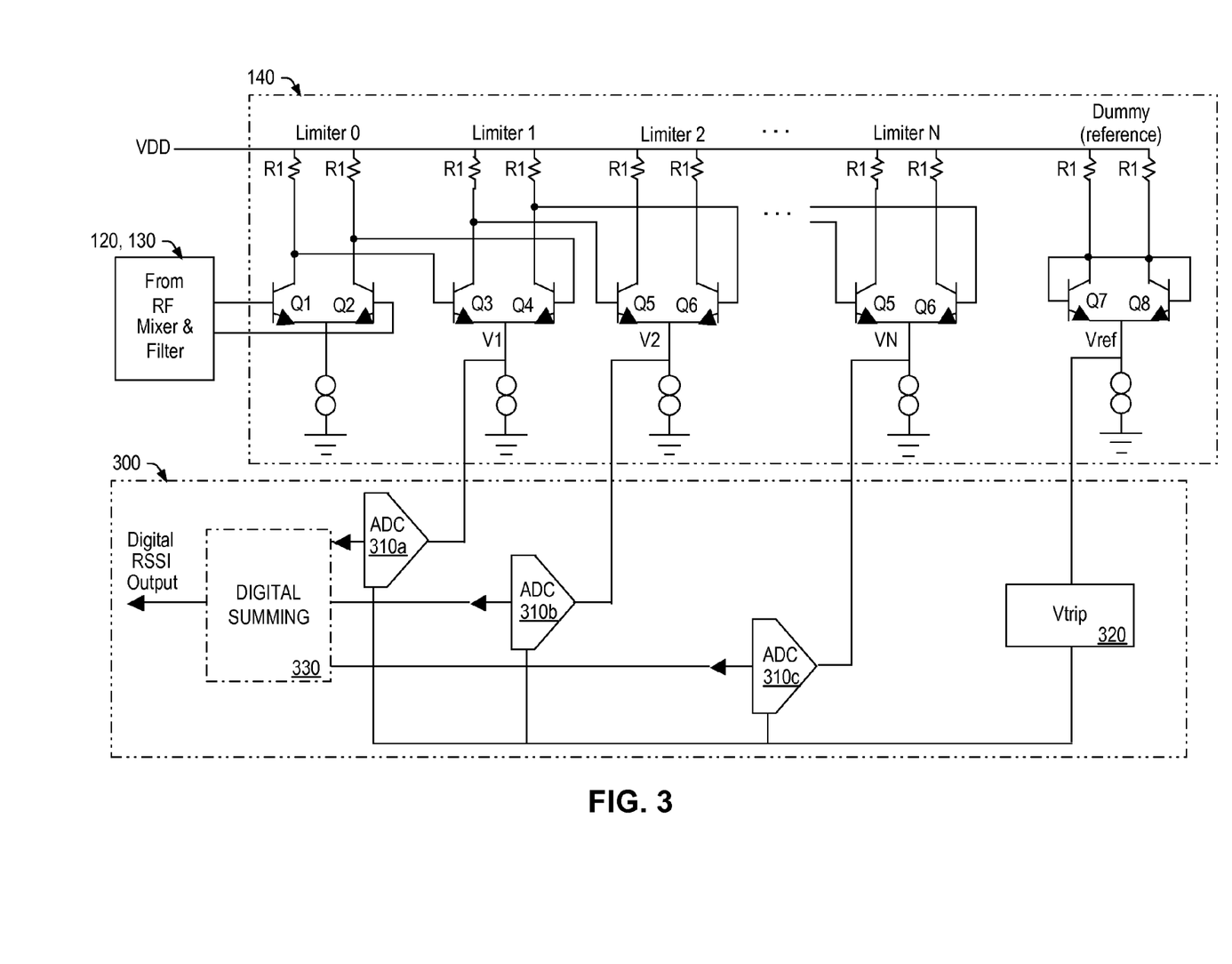
FIG. 3 is a simplified circuit schematic of an exemplary RSSI circuit, according to one embodiment of the invention.

FIG. 3 illustrates an improved RSSI circuit 300, in accordance with one embodiment of the invention. In the new circuit, the summation of the DC voltages is performed digitally to eliminate many (if not all) of the errors commonly found in analog summation circuits (such as the one shown in FIG. 2). In one embodiment, single-bit ADCs (e.g., single-bit comparators) 310 may be used at each limiting amplifier detection point (i.e., at each common emitter node) to generate a digital representation of each emitter voltage (V1, V2 . . . VN). The digital values output from each single-bit ADC may then be combined to form the RSSI value.

For example, RSSI circuit 300 may include a dummy (i.e., reference) limiter for generating a reference voltage (Vref) and a voltage trip (Vtrip) or level shift circuit 320 for triggering each of the single-bit ADCs, once the emitter voltage supplied thereto is greater than the reference voltage by a predetermined amount. As shown in FIG. 3, the dummy limiter may differ from the other limiters in the chain by coupling the base and collector terminals of the differential pair (Q7 and Q8) together. In other words, the collector terminals of the dummy limiter are not coupled to the collector terminals of a preceeding limiter in the chain. This enables the dummy limiter to generate a reference voltage, which is not based on the analog input signal. However, because the dummy limiter is otherwise identical to the other limiters in the chain, the reference voltage generated by the dummy limiter is able to eliminate offsets caused by variations in process and temperature. Generating the reference voltage within the limiter chain eliminates the need for external process/temperature compensation.

In general, Vtrip circuit 320 may be implemented with a resistor divider network, a level shift circuit, or any other circuit or component capable of providing a level shifted version of the reference voltage to ADCs 310. In some embodiments, the Vtrip circuit may be configured for supplying a substantially identical trip voltage to each of the ADCs. However, the Vtrip circuit may compensate for comparator offsets by supplying one or more different trip voltages to the ADCs, in other embodiments of the invention. Regardless, the single-bit ADC outputs may be triggered one at a time by the Vtrip circuit (because the emitter voltages increase with each successive limiter), until all bits are output to produce the digital RSSI word.

For higher resolution, multi-bit ADCs 310 could be used in place of the single-bit ADCs, and their outputs can be digitally summed. For example, digital summing logic 330 (e.g., a combination of adders) may be used, in some embodiments of the invention, to form the digital RSSI signal by adding the multi-bit outputs together. If multi-bit ADCs are used, Vtrip circuit 320 may cause the ADCs to output one multi-bit value at a time, as each successive limiter voltage exceeds the reference voltage. The multi-bit values may then be added together by digital summing logic 330 to generate the digital RSSI signal.

RSSI circuit 300 presents many advantages over conventional RSSI designs. First of all, RSSI circuit 300 provides a more highly simplified and accurate RSSI function than RSSI circuit 200. For example, the ADC requirements of RSSI circuit 300 are simplified, as it is "distributed" and can consist of several ADCs of only one (or a few) bits, rather than a larger multi-bit ADC. Replacing the large multi-bit ADC (220) shown in FIG. 2 with several smaller ADCs (310) may significantly reduce the cost and area associated with the comparators.

In addition, there is no error in the summing circuit and no ripple filter is needed in the improved RSSI circuit, since the emitter voltages are summed digitally. This means that the new circuit will consume less current and die area than previous designs. The improved RSSI circuit can also respond quicker without the slow time constant of a ripple filter, which in turn, enables quicker AGC threshold detection. For example, fewer preamble data bits may be required in a system employing AGC, enhancing throughput and reducing latency. In other words, preamble bits (i.e., predetermined non-data bits) are typically sent before the data to calibrate a receiver system for receiving the data. The number of preamble bits generally depends on the time it takes to generate an RSSI signal, supply the RSSI signal to the AGC module and stabilize the system. It is often desirable to minimize the number of preamble bits to save current and power. The improved RSSI circuit achieves such a goal by eliminating the extra time delay associated with the RC filter. All in all, the improved RSSI circuit provides increased accuracy with less circuitry (i.e., less chip area, less current) than previous designs.

As an additional advantage, the improved RSSI circuit is not dependent on the frequency of the analog input signal supplied thereto (e.g., the frequency of the IF signal received from the mixer and filter stages). Although prior art methods have been proposed for calculating a digital RSSI value, the proposed methods typically use a comparator for detecting the magnitude of the incoming IF signal and determining whether the magnitude is above or below a certain value. As such, the comparators used in the prior art must be fast enough to perform the comparison at the frequency of the incoming IF signal. In most cases, high-speed comparators must be used within the RSSI circuit, due to the relatively high IF frequencies (e.g., RF frequencies) used within the wireless receiver. Unlike the prior art, the improved RSSI circuit does not try to sample the analog signal at the input frequency. Instead, the improved RSSI circuit eliminates the need for high-speed comparators by generating a digital RSSI value based on an average of the common emitter voltages.

In addition to the uses described above, the RSSI signal generated by the new circuit can be used to create improved interference avoidance algorithms at the system level, as well as for improved automatic binding in wireless Human Interface Device (HID) products. However, one skilled in the art would understand that the new RSSI circuit would be useful in substantially any wireless receiver design.

Figure 4:
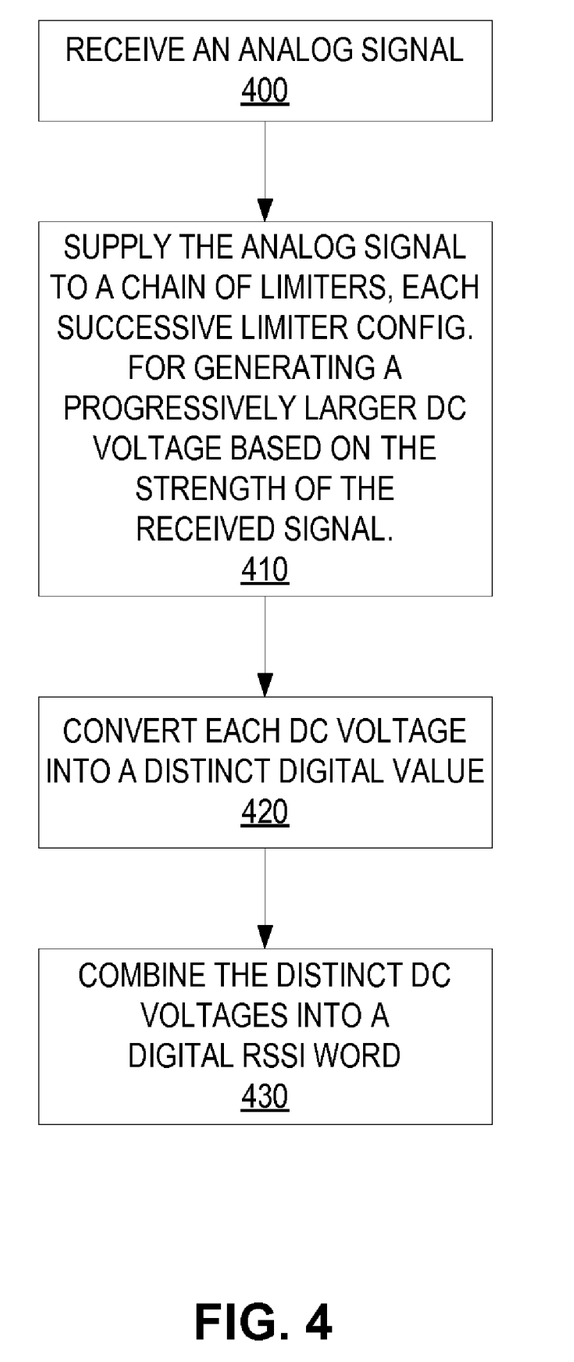
FIG. 4 is a flow chart diagram illustrating an exemplary method for detecting the signal strength of a received signal.

FIG. 4 illustrates an exemplary method for detecting the strength of a received signal, according to one embodiment of the invention. In some cases, the method may begin by receiving an analog input signal (step 400). For example, an antenna within a receiver portion of a radio may receive a radio frequency (RF) signal from a transmitting portion of another radio. As shown in FIG. 1, the RF signal may be amplified by a low noise amplifier, and down-converted and filtered by mixer and filter stages of the receiver. In step 410, the analog input signal (now an intermediate frequency signal) may be supplied to a chain of limiting gain amplifiers (or "limiters"). As noted above, each successive limiter may be configured for generating a progressively larger DC voltage based on the strength of the received signal. Next, each DC voltage generated by the limiter chain may be converted into a distinct digital value (step 420). For example, single-bit or multi-bit analog to digital converters (ADCs) may be coupled to the common emitter terminals of each limiter for converting the DC voltages into distinct digital values, as shown in FIG. 3 and described above.

The strength of the received signal may then be detected by combining the distinct digital values into an RSSI word (step 430). In some cases, single-bit digital values may be successively output from the RSSI circuit to form the RSSI word. However, if multi-bit ADCs are used, digital summing logic may be employed to form the RSSI word by adding together a plurality of multi-bit digital values.

Figure 5:
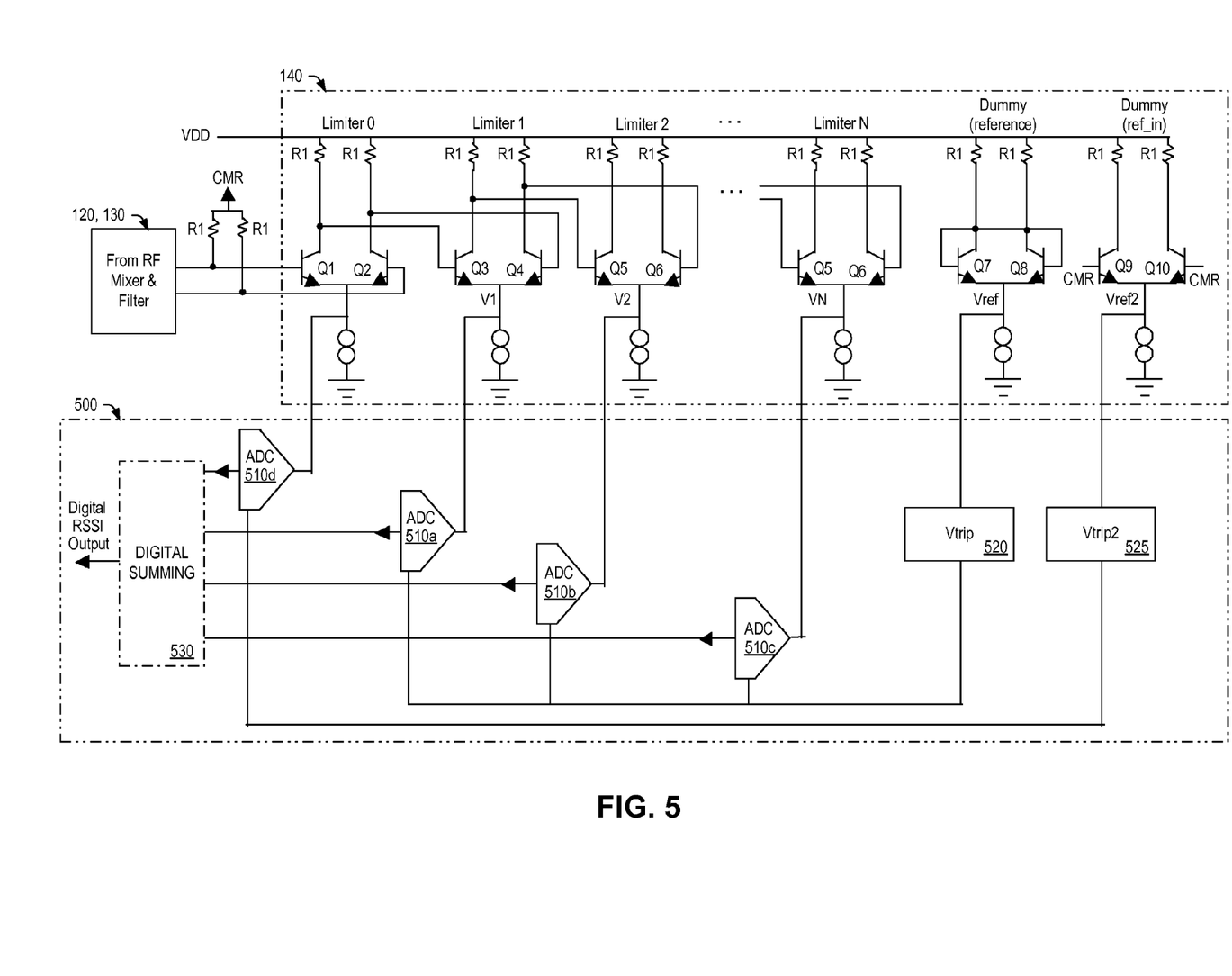
FIG. 5 is a simplified circuit schematic of an exemplary RSSI circuit, according to one alternative embodiment of the invention.
Figure 6:
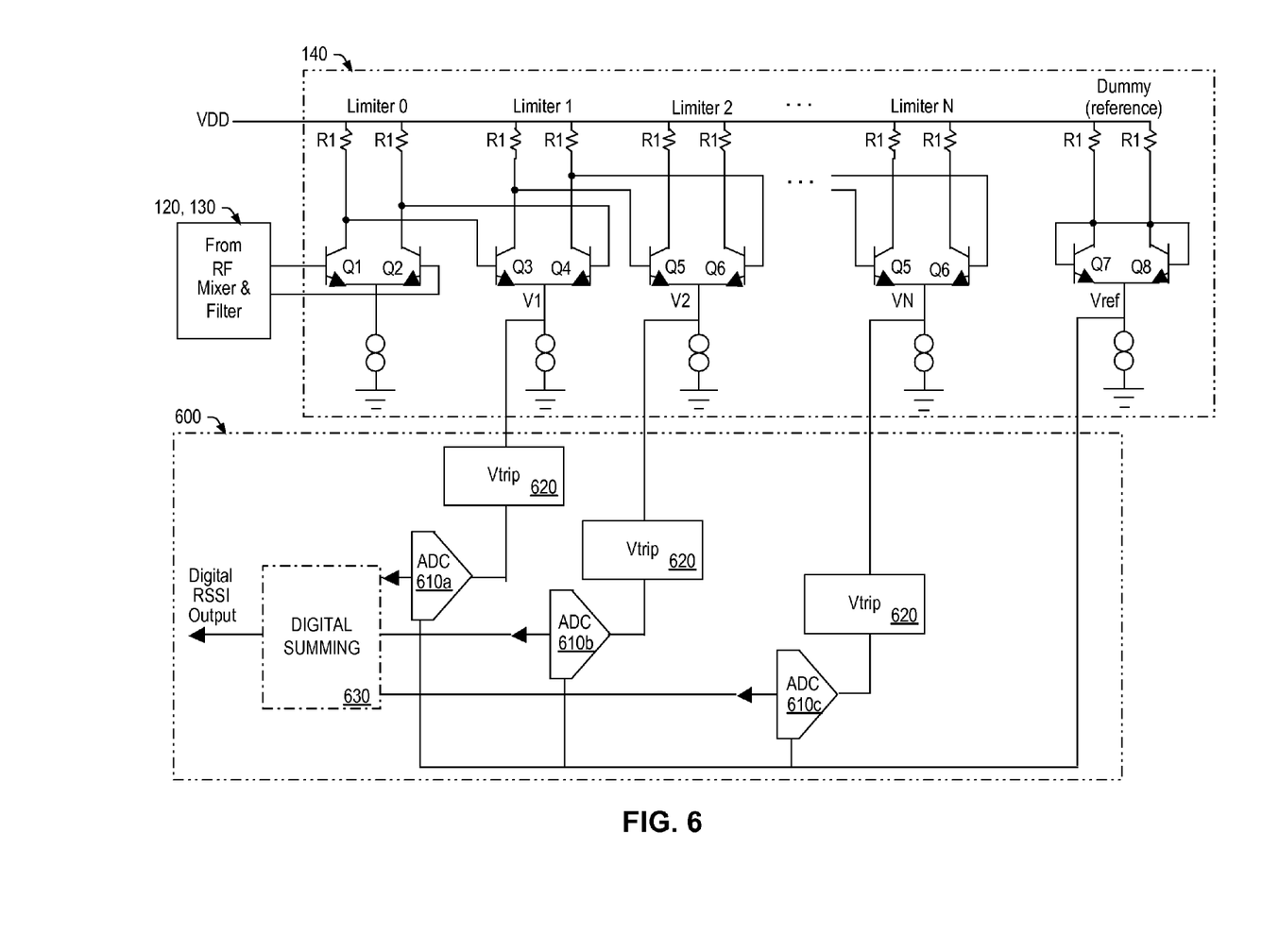
FIG. 6 is a simplified circuit schematic of an exemplary RSSI circuit, according to another alternative embodiment of the invention.

Alternative embodiments of an improved RSSI circuit are shown in FIGS. 5 and 6. These alternative embodiments include many of the circuit features, and as a result, retain many of the advantages as disclosed above in the RSSI circuit of FIG. 3. Similar circuit features are denoted with similar reference numerals. Repeat description of the similar circuit features will not be repeated herein for purposes of brevity.

In one alternative embodiment, the dynamic range of RSSI circuit 300 may be extended by including the DC voltage of the first limiter (limiter 0) within the RSSI output. In FIG. 3, the DC voltage generated at the emitter terminals of the first limiter in RSSI circuit 300 is not used in the digital calculation of the RSSI value. This is because the DC input to the first limiter is not necessarily the same as the inputs to the remaining limiters. To solve this, an additional dummy limiter (ref in), Vtrip circuit (525) and analog-to-digital converter (510*d*) may be included within the RSSI circuit (500), as shown in FIG. 5. The additional dummy limiter is referenced to the DC output value (i.e., the common mode reference) of the IF filter (i.e., by supplying the CMR to the input terminals of transistors Q9 and Q10). The additional Vtrip circuit (525) is independently configured for supplying an appropriate reference voltage (Vref2) to the additional ADC (510*d*), thereby allowing the output of the ADC to be included within the digital RSSI calculation. Therefore, the embodiment shown in FIG. 5 provides a means for extending the dynamic range of the RSSI detection without adding additional limiters to the limiter chain.

As noted above, RSSI circuit 300 includes a Vtrip circuit (320) for supplying a level shifted version of the reference signal (Vref) to each of the comparators (ADCs 310*a*-310*c*). However, instead of shifting the reference voltage, the DC voltages generated at the emitter terminals of the limiter chain may be level shifted by inserting a Vtrip circuit (620) between each limiter and comparator pair. In some cases, the Vtrip circuits shown in FIG. 6 may be used to compensate for comparator offsets by supplying one or more different trip voltages to the ADCs.

It will be appreciated to those skilled in the art having the benefit of this disclosure that this invention is believed to provide improved RSSI circuits and methods for detecting the strength of a received signal. The circuits and methods described herein improve upon previous designs by providing digital, rather than analog, summing of the common emitter voltages within the limiter chain. Additional improvements include the use of an internally generated reference signal, which tracks variations in process and temperature.

Further modifications and alternative embodiments of various aspects of the invention will be apparent to those skilled in the art in view of this description. As noted above, for example, the transistors used within the limiter chain can be of any type, including but not limited to, bipolar (NPN or PNP) and MOS (N- or P-channel) transistors. In addition, or alternatively, a dummy reference limiter can be made local to each differential pair, reducing the DC offset between the reference voltage and the emitter nodes, to further improve accuracy. It is intended that the following claims be interpreted to embrace all such modifications and changes and, accordingly, the specification and drawings are to be regarded in an illustrative rather than a restrictive sense.

What is claimed is:

1. A method for determining a received signal strength indication (RSSI) value, the method comprising:
   receiving an analog input signal;
   converting the analog input signal into a plurality of DC voltages, each successive DC voltage progressively larger than a previous DC voltage;
   generating a reference voltage using a dummy limiter; and
   converting the plurality of DC voltages into a plurality of digital values using the reference voltage before the digital values are combined to produce the RSSI value.

2. The method as recited in claim 1, wherein the step of converting the plurality of DC voltages comprises generating the plurality of digital values by comparing each of the plurality of DC voltages to a reference voltage.

3. The method as recited in claim 1, wherein if each of the digital values comprises only one bit, the plurality of digital values are combined to produce the RSSI value by outputting each of the digital values one at a time.

4. The method as recited in claim 1, wherein if each of the digital values comprises more than one bit, the plurality of digital values are combined to produce the RSSI value by adding the plurality of digital values together and outputting the sum.

5. A circuit comprising:
   a chain of limiters coupled in series and configured for receiving an analog input signal, wherein each successive limiter is configured for generating a progressively larger DC voltage based on a signal strength of the analog input signal;
   a plurality of analog to digital converters (ADCs), each coupled to a different one of the limiters for converting the progressively larger DC voltages into digital voltage values, which are combined to form a digital received signal strength indication (RSSI) value for the analog input signal; and
   a dummy limiter coupled to file chain of limiters and configured for generating a reference voltage, wherein the reference voltage is supplied to each of the plurality of ADCs for converting the progressively larger DC voltages into the digital voltage values.

6. The circuit of claim 5, wherein each limiter in the chain comprises a pair of transistors having common emitter terminals, which are connected together, and collector terminals, which are coupled together through one or more resistors, or alternatively, one or more active loads.

7. The circuit of claim 6, wherein a first limiter in the chain comprises a pair of transistors having base terminals, which are coupled for receiving the analog input signal.

8. The circuit of claim 7, wherein each successive limiter, after the first limiter in the chain, comprises a pair of transistors having:
   (i) base terminals, which are coupled to collector terminals of a previous limiter in the chain, and
   (ii) common emitter terminals, which are coupled together and configured for generating one of the progressively larger DC voltages.

9. The circuit of claim 5, further comprising a level shift circuit coupled between the dummy limiter and each of the ADCs for supplying a level shifted version of the reference voltage to the ADCs.

10. The circuit of claim 5, wherein each of the plurality of ADCs are configured for converting one the progressively larger DC voltages into a corresponding single-bit digital voltage value.

11. The circuit of claim 5, wherein each of the plurality of ADCs are configured for converting one the progressively larger DC voltages into a corresponding multi-bit digital voltage value.

12. The circuit of claim 11, further comprising a digital summing logic block coupled to an output of each ADC for combining the multi-bit digital voltage values into the digital RSSI value by adding the multi-bit digital voltage values together.

13. A wireless receiver circuit, comprising:
   an antenna for receiving an analog input signal;
   a dummy limiter configured for generating a reference voltage; and
   a received signal strength indicator (RSSI) circuit coupled with the dummy limiter for detecting a strength of the analog input signal by using the reference voltage for converting a plurality of progressively larger DC voltages associated with the analog input signal into a plurality of digital values before the digital values are combined to produce a digital RSSI value.

14. The wireless receiver circuit of claim 13, further comprising a chain of limiters coupled in series, wherein a first limiter in the chain is configured for receiving the analog input signal, and wherein each successive limiter after a first limiter is configured for generating a progressively larger DC voltage than a previous limiter.

15. The wireless receiver circuit of claim 14, wherein the dummy limiter is coupled to a chain of limiters configured to generate the plurality of progressively larger DC voltages.

16. The wireless receiver circuit of claim 15, wherein the RSSI circuit comprises a plurality of analog to digital converters (ADCs) configured for converting the progressively larger DC voltages into the digital voltage values by comparing each of the progressively larger DC voltages to the reference voltage.

17. The wireless receiver circuit of claim 16, further comprising a level shift circuit coupled between the additional limiter and each of the ADCs for supplying a level shifted version of the reference voltage to the ADCs.

18. The wireless receiver circuit of claim 17, wherein each of the plurality of ADCs are configured for converting one of the progressively larger DC voltages into a corresponding single-bit digital voltage value, and wherein by supplying the level shifted version of the reference voltage, the level shift circuit signals the ADCs to produce the digital RSSI value by outputting the single-bit digital voltage values one at a time.

19. The wireless receiver circuit of claim 17, wherein each of the plurality of ADCs are configured for converting one of the progressively larger DC voltages into a corresponding multi-bit digital voltage value.

20. The wireless receiver circuit of claim 19, further comprising a digital summing logic block coupled to an output of each ADC for producing the digital RSSI value by adding the multi-bit digital voltage values together.

* * * * *